United States Patent Office 3,038,702
Patented June 12, 1962

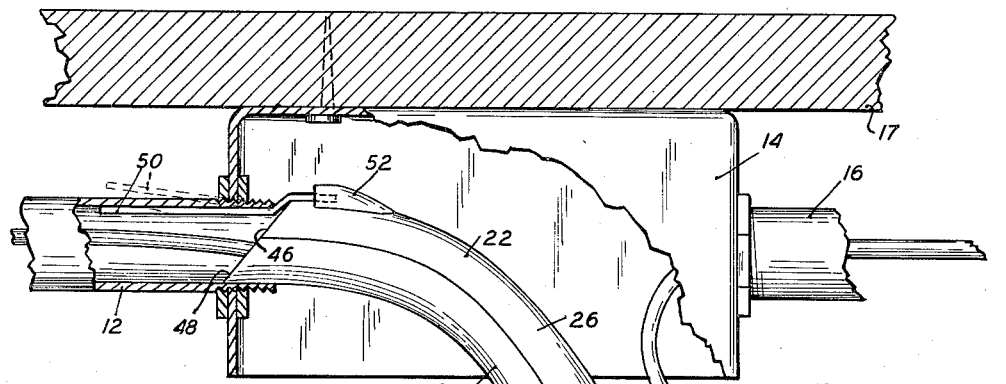

3,038,702
HINGED WIRE GUIDE
Harold K. Trunnell, P.O. Box 3346, Eugene, Oreg.
Filed Aug. 29, 1958, Ser. No. 758,155
9 Claims. (Cl. 254—134.3)

This invention relates to a wiring guide or feeder and more particularly to a wire guiding device which is to have one end thereof mounted on the open end of a conduit for electric wires and to assist in the smooth feeding of wires into the conduit, and which device is so constructed, to permit the same to be removed from or mounted upon a continuous strand of wire.

Wire feeders or wire guiding devices as previously proposed have, in general, comprised a funnel like member having an enlarged entrance bell at one end, the opposite end of the device being of reduced diameter and adapted to fit into or abut against a conduit into which wires are to be pulled. Such prior devices could be mounted upon or removed from wire only by sliding the device on or off an end of a wire. This has limited the use of the devices.

In accordance with the present invention, I have provided a wire feeder that is split longitudinally so as to provide parts which are separable along a longitudinally extending line thus enabling the wire feeder to be mounted upon or removed from a strand of wire. I have also provided means for holding the parts of a member against accidental separation and for mounting the device upon the end of a conduit.

It is, therefore, an object of the invention to provide an improved wire feeder which can be mounted upon or removed from continuous strands or loops of wire.

A further object of the invention is to provide a wire feeder having separable parts as described with means to secure the parts of the wire feeder together.

Still another object of the invention is to provide a wire feeder of the type described and with improved means for securing the wire feeder upon the end of a conduit.

Other objects and advantages of the invention will appear in the following description of preferred embodiments thereof shown in the attached drawings in which:

FIG. 1 is a side elevation of a wire feeder made in accordance with the invention showing the wire feeder mounted upon a conduit terminating in a junction box;

FIG. 2 is a view of the wire feeder shown in FIG. 1 as viewed from the enlarged end thereof and showing the wire feeder in its open condition.

FIG. 3 is a fragmentary view of the end of the wire feeder showing a modified arrangement for securing the feeder to the end of a conduit;

FIG. 4 is a sectional view taken along line 4—4 of FIG. 3; and

FIG. 5 is a fragmentary view of an end of a wire feeder showing still another arrangement for securing the wire feeder to the end of a conduit.

Referring now more particularly to FIGS. 1 and 2, therein is illustrated a wire feeder 10 made in accordance with the invention, the feeder being shown mounted on the end of a conduit 12 extending into a junction box 14 to which a further conduit 16 is connected. The junction box is shown secured to a structural member 17. As is well known, it is frequently desired to thread a wire or a group of wires such as shown at 18 from one of the conduits leading into a junction box directly into another conduit and without making a splice in the wire or wires within the box. The wire feeder 10 of the invention is particularly adapted in overcoming problems encountered when it is desired to lead wires through a junction box in this fashion.

As shown in FIGS. 1 and 2, the wire feeder 10 comprises a funnel shaped body member narrowing from a relatively wide mouth bell section 20 to a tubular tail section 22. Preferably, the outer diameter of the tail section 22 is the same as the outer diameter of the conduit 12 and preferably, the tail section 22 is longitudinally curved so that the central axis of the bell 20 is disposed at an oblique angle with respect to the axis of the end of the tail section 22 to facilitate use of the feeder in situations such as that illustrated. In other instances, however, the tail section 22 may be a straight tube.

The body of the wire feeder 10 is split longitudinally along lines which are spaced 90 degrees from the plane of symmetry of the body to define two parts 24, 26 hingedly connected together by a hinge pin 28 which extends parallel to the axis of the bell section 20. As will be apparent the body member is symmetrical about a single plane parallel to the plane of the drawing as the feeder is shown in FIG. 1 and which plane would bisect parts 24, 26 along lines 23, 25, respectively, as indicated in FIG. 2. As most clearly shown in FIG. 1, the pin 28 extends through hinge members 30, 32 suitably secured to the part 24 and through hinge members 34, 36 suitably secured to the part 26. The pin 28 may be held in position by any suitable means such as providing the same with an enlarged head 38 on one end and providing the other end with an opening to receive a cotter key 40.

As will be obvious, the wire feeder 10 can be easily removed or mounted upon one or more strands of wire, a single wire 18 being shown, simply by opening the parts 24, 26.

Means are preferably provided releasably to hold the parts 24, 26 in closed position to prevent accidental separation thereof and to secure the feeder member to the end of a conduit. In the embodiment illustrated in FIGS. 1 and 2, the end of the tail section 22 which is to be attached to the end of a conduit is cut at an angle to provide an end surface 46 which extends at an acute angle to the center line or longitudinal axis of the tail section 22 at the end thereof. This provides a pointed portion 48 at one side of the tail section 22 and an opening in the end thereof which extends rearwardly of the tail section from the pointed end 48. In the preferred construction, the pointed portion 48 is on the side of the tail section 22 nearest the center of longitudinal curvature thereof. The tail section 22 is slightly flattened at its end in a direction at right angles to the pointed end so as to narrow the end portion thereof and permit it to be inserted into the end of a conduit 12. As shown in FIG. 1, the end surface 46 is slanted at such an angle that when the end of the tail portion 22 is inserted into the end of a conduit, the rearward portion of the opening is immediately adjacent the end of a conduit.

In the embodiment of the invention shown in FIGS. 1 and 2, a finger member 50 is secured to the part 26 at a point diametrically opposite the pointed end 48 by inserting the end of the finger member into a housing 52 formed on the part 26 and in which the finger member is engaged. Preferably the finger member 50 is of a resilient material and has a normal position, indicated in dotted lines, spaced from the end portion 48 by a distance greater than the inner diameter of the conduit 12 when the tail section has its end inserted in the conduit. Thus, when the finger member 50 is inserted into the conduit and the end 46 of the tail of the feeder is also inserted into the conduit, the finger member will frictionally engage the conduit wall to hold the feeder securely in position as wires 18 are drawn therethrough. In addition to securing the wire feeder in place, the arrangement of the finger member 50, together with the projecting end 48 of the part 24, serves to secure the parts 24, 26 against separation when the wire feeder is mounted on the conduit 12.

As will be apparent, to mount the wire feeder upon a strand of wire, the parts 24, 26 are simply swung apart and the strand inserted therein. Thereafter, the feeder 10 can be mounted upon a conduit and which will secure the parts 24, 26 against separation. When the wire has been drawn into the conduit to the desired extent, the feeder can be removed from the conduit, the parts 24, 26 separated and the feeder removed from the wire.

A modification of the means for holding the parts of the wire feeder together and for holding the same upon the end of a conduit 12 is shown in FIGS. 3 and 4. In this arrangement, the part 24' of the wire feeder is formed with a projecting end portion 60 adapted to be inserted into the conduit 12 and to engage against the wall thereof. Hingedly mounted upon the part 26' is a finger member 62 having a hinge mounting indicated at 64. The finger member 62 is hinged for movement toward and away from the projecting end portion 60 so as to engage when inserted into the conduit the wall portion of the conduit opposite that engaged by the end portion 60. A spring 66 or other resilient means preferably is provided to urge the finger member 62 to a normal position spaced from the end portion 60 by a distance greater than the inner diameter of the conduit 12. As shown, the finger member 62 is preferably of greater length than the end portion 60 to facilitate mounting of the wire feeder upon the conduit. In mounting the wire feeder, the finger 62 is inserted just a slight distance inside the conduit 12 and the wire feeder pressed inwardly toward the bottom of the junction box 14 until the end portion 60 is brought within the outline of the conduit 12 whereafter the feeder may be moved longitudinally to move the end portion 60 within the conduit and bring the feeder into position adjacent the conduit end. As will be apparent, the arrangement of the finger 62 and end portion 60 serve to secure the wire feeder 10 to the end of the conduit and in addition, prevent accidental separation of the parts 24', 26'. The operation of the feeder in use will be obvious from the foregoing.

A still further arrangement for securing the parts of the wire feeder together is shown in FIG. 5 wherein the separable parts are indicated at 24" and 26". In this embodiment, the part 24" is formed with an integral end portion 70 extending from the end of the tail section 22" adapted to be secured to the conduit 12. Associated therewith is a clip member 72 including a split ring portion 74 which may be slidably mounted on the end of the tail portion 22 to encompass the same and prevent separation of the parts 24" and 26". The clip member 72 also includes a finger portion 76 which extends outwardly from the tail section 22" diametrically opposite the projection 70. Preferably, the finger portion 76 is of resilient material and has a normal position spaced from the projection 70 by a distance greater than the inner diameter of the conduit 12. Preferably also, the finger 76 is in the fully mounted position of the clip 72 of greater length than the projection 70. Thus, to mount the wire feeder 10" on the conduit 12, the finger member 76 is engaged within the end of a conduit and the wire feeder is pressed toward the bottom of the junction box 14 until the projection 70 is sufficiently close to the finger 74 to permit its entry into the conduit whereupon the wire feeder is moved axially relative to the conduit 12 to insert the projection therein. The frictional engagement of the finger 76 and the projection 70 will hold the feeder member in position on the end of a conduit. After a wire or group of wires has been drawn into the conduit 12, the wire feeder member can simply be withdrawn from the conduit and the clip member 72 removed and the parts 24", 26" swung apart to remove the wire 18 therefrom and which can be removed from the clip member simply by slipping it through the gap therein.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:

1. A wire feeder for guiding wires into the end of a conduit, said wire feeder comprising a tubular member having a first open end for guiding wires into said feeder and a second open end of smaller diameter than said first end for attachment to the end of a conduit, said tubular member being split longitudinally thereof to provide parts separable along a longitudinally extending line to enable said wire feeder to be removed from a strand of wire, hinge means adjacent said first end for separably connecting said parts to one another, said hinge means having an axis generally parallel to the axis of said first end, and resilient means for holding said parts together when said second end is attached to said conduit including an element extending from said second end in a direction axially of said second end and insertable into said end of said conduit for holding said feeder in position relative to said conduit.

2. A wire feeder for guiding wires into the end of a conduit, said wire feeder comprising a tubular member having a first open end for guiding wires into said feeder and a second open end of smaller diameter than said first end for attachment to the end of a conduit, said tubular member being curved and having a single plane of symmetry and being split longitudinally thereof along lines which are spaced approximately 90° circumferentially of said member from said plane to provide parts separable along a longitudinally extending line to enable said wire feeder to be removed from a strand of wire, and hinge means adjacent said first end for separably connecting said parts to one another, said hinge means having an axis generally parallel to the axis of said first end.

3. A wire feeder for guiding wires into the end of a conduit, said wire feeder comprising a tubular member having a first open end for guiding wires into said feeder and a second open end of smaller diameter than said first end for attachment to the end of a conduit, said tubular member being split longitudinally thereof to provide parts separable along a longitudinally extending line to enable said wire feeder to be removed from a strand of wire, hinge means adjacent said first end for separably connecting said parts to one another, said hinge means having an axis generally parallel to the axis of said first end, spring means on said second end of said member and for holding the parts of said member together when said second end is attached to a conduit and including an element extending from said second end in a direction axially of said second end and insertable into said end of said conduit for engaging the said end of said conduit to releasably retain said wire feeder therein.

4. A wire feeder for guiding wires into the end of a conduit, said wire feeder comprising a tubular member having a first open end for guiding wires into said feeder and a second open end of smaller diameter than said first end for attachment to the end of a conduit, said tubular member being split longitudinally thereof to provide parts separable along a longitudinally extending line to enable said wire feeder to be removed from a strand of wire, hinge means separably connecting said parts to one another, said second member end being formed to provide a projecting end portion on one of said parts, said end portion being adapted to be inserted into a conduit and to engage the wall thereof, and resilient means for holding said parts together and holding said end portion in said conduit including a finger member extending from said second end diametrically opposite said projecting end portion for engaging the wall of a conduit opposite said end portion, said finger member having a normal position spaced from said end portion by a distance greater than the inner diameter of the conduit of which the wire feeder is to be attached.

5. A wire feeder for guiding wires into the end of a conduit, said wire feeder comprising a tubular member having a first open end for guiding wires into said feeder and a second open end of smaller diameter than said first end for attachment to the end of a conduit, said tubular member being split longitudinally thereof to provide parts separable along a longitudinally extending line to enable said wire feeder to be removed from a strand of wire, hinge means separably connecting said parts to one another, said second member end terminating in end surfaces extending at an acute angle to the central axis of said member at said second end and at an acute angle to the central axis of said member at said second end and at an acute angle relative to the line of separation of said parts at said second end to provide a pointed end portion on one of said parts, said end portion being adapted to be inserted into a conduit and to engage the wall thereof, resilient means for holding said parts together and holding said end portion in said conduit including a finger member extending from said second end diametrically opposite said pointed end portion, said finger member having a normal position spaced from said pointed end portion by a distance greater than the inner diameter of the conduit to which said wire feeder is to be attached.

6. A wire feeder for guiding wires into the end of a conduit, said wire feeder comprising a tubular member having a first open end for guiding wires into said feeder and a second open end of smaller diameter than said first end for attachment to the end of a conduit, said tubular member being split longitudinally thereof to provide parts separable along a longitudinally extending line to enable said wire feeder to be removed from a strand of wire, hinge means separably connecting said parts to one another, said second member end terminating in end surfaces extending at an acute angle to the central axis of said member at said second end and at an acute angle relative to the line of separation of said parts at said second end to provide a pointed end portion on one of said parts, said end portion being adapted to be inserted into a conduit and to engage the wall thereof, and a spring member attached to the other of said parts and extending from said second end diametrically opposite said pointed end portion for engaging the wall of a conduit at a point opposite said end portion, said spring member having a normal spacing from said pointed end portion greater than the inner diameter of the conduit to which said wire feeder is to be attached.

7. A wire feeder for guiding wires into the end of a conduit, said wire feeder comprising a tubular member having a first open end for guiding wires into said feeder and a second open end of smaller diameter than said first end for attachment to the end of a conduit, said tubular member being split longitudinally thereof to provide parts separable along a longitudinally extending line to enable said wire feeder to be removed from a strand of wire, hinge means separably connecting said parts to one another, said second member end being formed to provide a projecting end portion, one of said parts adapted to be inserted into a conduit and to engage the wall thereof, resilient means for holding said parts together and holding said projecting end portion in said conduit including a finger member hingedly mounted on the other of said parts for movement toward and away from said second member and diametrically opposite said projecting end portion, and a spring resiliently urging said finger member to a normal position spaced from said end portion by a distance greater than the inner diameter of the conduit to which the wire feeder is to be attached.

8. A wire feeder as set forth in claim 7 wherein said finger is of greater length than said projecting end portion.

9. A wire feeder as set forth in claim 4 wherein said resilient means includes a split ring portion slidably mounted on said second end of said tubular member for holding said parts together, and said finger member is carried by and extends from said split ring portion.

References Cited in the file of this patent

UNITED STATES PATENTS

| | | |
|---|---|---|
| 167,548 | Lilley | Sept. 7, 1875 |
| 2,360,485 | Foster et al. | Oct. 17, 1944 |
| 2,515,724 | McCroskey | July 18, 1950 |
| 2,565,693 | Lewis | Aug. 28, 1951 |
| 2,649,746 | Taylor | Aug. 25, 1953 |